United States Patent
Fei et al.

(10) Patent No.: US 8,974,871 B2
(45) Date of Patent: Mar. 10, 2015

(54) ULTRA-VIOLET CURING MACHINE

(71) Applicants: Fu Ding Electronical Technology (Jiashan) Co.,Ltd., Zhejiang (CN); Hon Hai Precision Industry Co., Ltd., New Taipei (TW)

(72) Inventors: Jun-Min Fei, Jiashan (CN); Huo-Zhong Wu, Jiashan (CN); Jian-Hua Xu, Jiashan (CN)

(73) Assignees: Fu Ding Electronical Technology (Jiashan) Co., Ltd., Zhejiang (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/451,923

(22) Filed: Aug. 5, 2014

(65) Prior Publication Data

US 2015/0041677 A1   Feb. 12, 2015

(30) Foreign Application Priority Data

Aug. 9, 2013 (CN) .................. 2013 2 0485363 U

(51) Int. Cl.
*B05D 3/06* (2006.01)

(52) U.S. Cl.
CPC ....................................... *B05D 3/067* (2013.01)
USPC ..... 427/558; 427/551; 156/275.5; 156/275.7; 156/272.2; 522/2; 250/461.1; 250/504 R; 250/365

(58) Field of Classification Search
CPC .. B29C 2035/0827; B05D 3/06; B05D 3/067; B05D 3/061
USPC ............... 427/551, 557–559, 581; 156/272.2, 156/275.5, 275.7; 250/365, 372, 453.11, 250/455.11, 454.11, 461.1, 504 R; 522/2
See application file for complete search history.

(56) References Cited

U.S. PATENT DOCUMENTS

| | | | |
|---|---|---|---|
| 5,934,191 A * | 8/1999 | Tukahara et al. .......... | 101/128.4 |
| 5,985,376 A * | 11/1999 | Kamen ......................... | 427/504 |
| 6,224,709 B1 * | 5/2001 | Takemoto et al. ......... | 156/275.5 |
| 6,280,059 B1 * | 8/2001 | Ito et al. ....................... | 362/269 |
| 6,471,801 B2 * | 10/2002 | Takemoto et al. ............. | 156/60 |
| 6,503,358 B1 * | 1/2003 | Takemoto et al. ............ | 156/295 |
| 7,632,434 B2 * | 12/2009 | Duescher ........................ | 264/12 |
| 2001/0011577 A1* | 8/2001 | Takemoto et al. ......... | 156/275.5 |
| 2001/0011578 A1* | 8/2001 | Takemoto et al. ......... | 156/275.5 |
| 2001/0054479 A1* | 12/2001 | Takemoto et al. ......... | 156/275.5 |
| 2004/0154724 A1* | 8/2004 | Takemoto et al. ............. | 156/85 |
| 2004/0235406 A1* | 11/2004 | Duescher ...................... | 451/527 |
| 2012/0039665 A1* | 2/2012 | Richardson et al. ......... | 403/265 |

* cited by examiner

*Primary Examiner* — Bernard E Souw
(74) *Attorney, Agent, or Firm* — Novak Druce Connolly Bove + Quigg LLP

(57) ABSTRACT

A curing machine to cure a UV-curable adhesive adhering on a workpiece, the workpiece having a slot thereon and a hole on a sidewall of the slot. The hole receives the UV-curable adhesive, the curing machine can include a curing mechanism. The curing mechanism can include a base plate holding a curing assembly and the curing assembly can include a holding member, at least one UV lamp being coupled to the holding member. Axis of the at least one UV lamp can intersect with the holding member at an angle of less than 90 degrees. A workpiece being positioned on the base plate, the UV lamp can irradiate directly an inside or an outside of a sidewall through the hole in the sidewall of the slot.

19 Claims, 4 Drawing Sheets

ULTRA-VIOLET CURING MACHINE

FIELD

The present disclosure relates to devices for curing adhesive.

BACKGROUND

After UV (ultraviolet)-curable adhesive is dispensed onto a workpiece, a UV (ultraviolet)-curable adhesive curing machine must be used to cure the adhesive.

BRIEF DESCRIPTION OF THE DRAWINGS

Implementations of the present technology will now be described, by way of example only, with reference to the attached figures.

DETAILED DESCRIPTION

Figure 1:
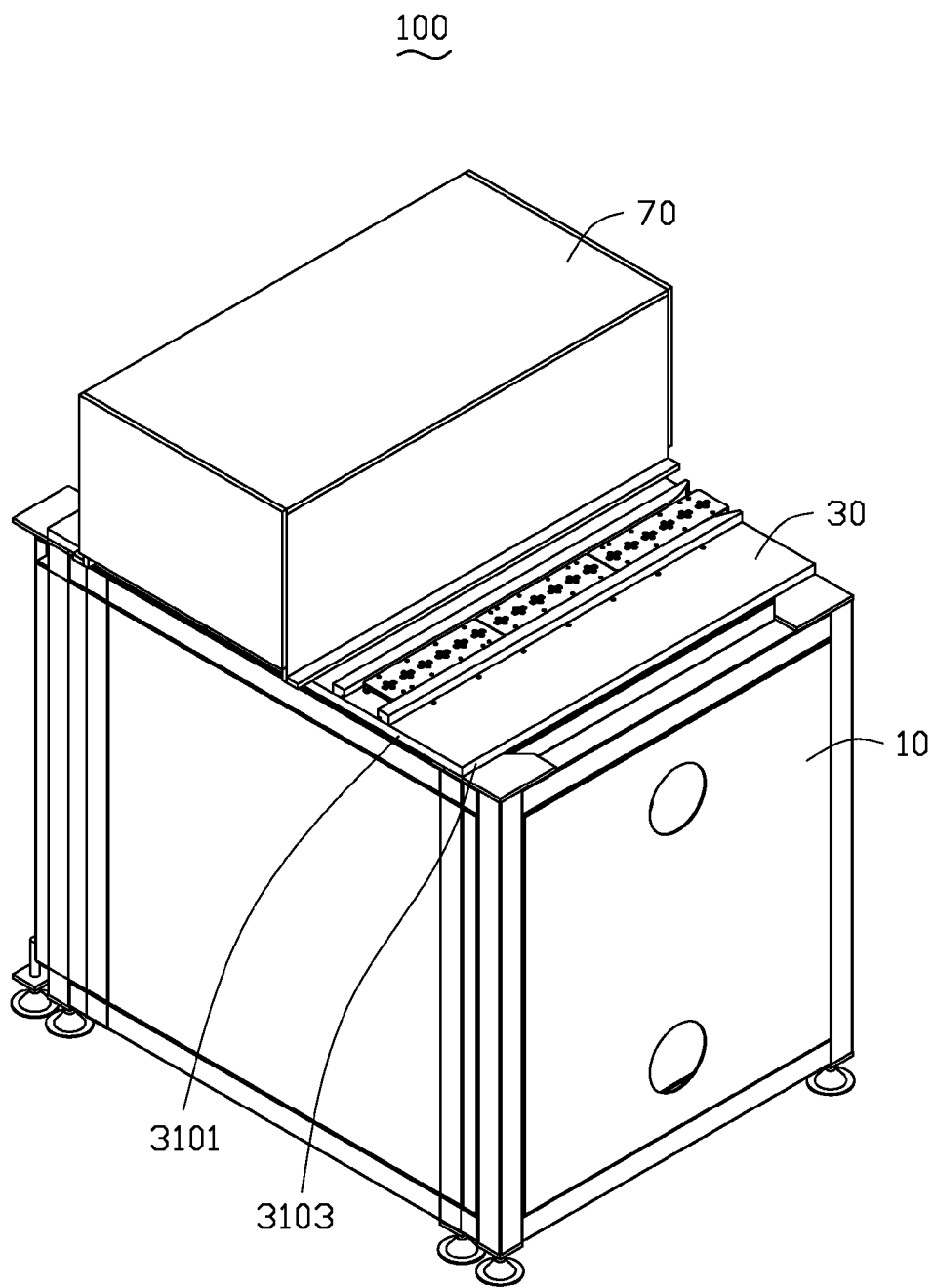
FIG. 1 is an isometric view of an embodiment of a curing machine.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is described in relation to curing machines.

A curing machine works to cure with ultra-violet (UV) light adhesive adhering on a workpiece. The workpiece can define a slot thereon and a hole on a sidewall of the slot. The hole can be configured to receive the UV-curable adhesive, the curing machine can include a curing mechanism. The curing mechanism can include a base plate and at least one curing assembly coupled to the base plate. The at least one curing assembly can include a holding member coupled to the base plate, and at least one UV lamp coupled to the holding member. Axis of the at least one UV lamp can intersect with the holding member at an angle of less than 90 degrees. At least one workpiece can be positioned on the base plate targeted by the at least one UV lamp. The axis of each UV lamp can intersect with the sidewall of the slot at an angle of less than 90 degrees. An irradiating end of each UV lamp can face the hole on a sidewall of the slot, such that the UV lamp can irradiate directly onto an inside or an outside of the sidewall.

Figure 2:
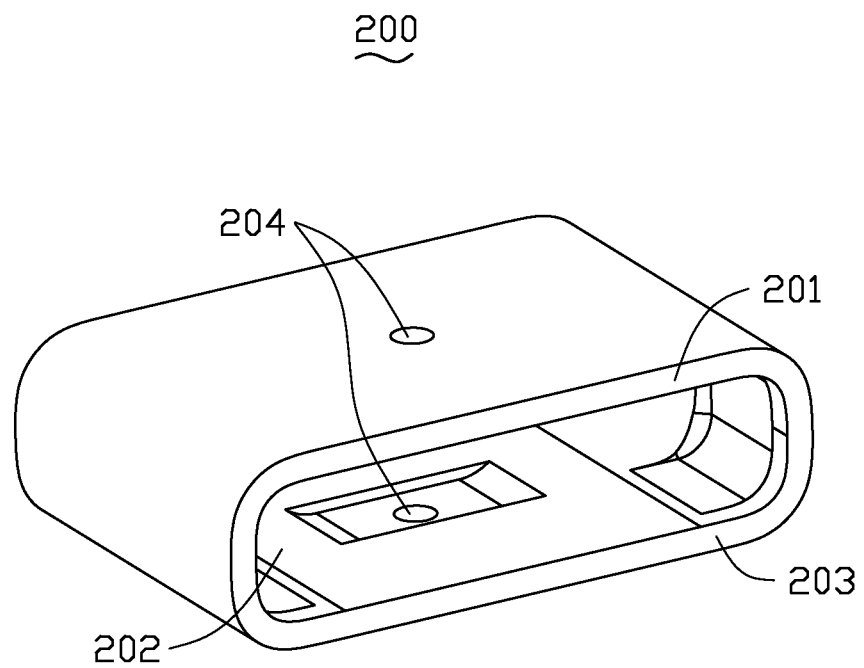
FIG. 2 is an isometric view of a workpiece in the curing machine of FIG. 1.

FIG. 1 illustrates an embodiment of a curing machine 100. FIG. 2 illustrates a workpiece 200 subjected to the curing machine 100. The curing machine 100 can be configured to irradiate a UV-curable adhesive adhering on the workpiece 200 with a UV lamp, thereby curing and solidifying the UV-curable adhesive. The workpiece 200 can be a hollow block, and can include a first sidewall 201 and a second sidewall 203 opposite to the 201, and define a slot 202 between the 201 and 203. The first sidewall 201 and the second sidewall 203 can be substantially parallel to each other. The workpiece 200 can define a hole 204 on the first sidewall 201 and on the second sidewall 203. The holes 204 can be configured to receive the UV-curable adhesive.

Figure 3:
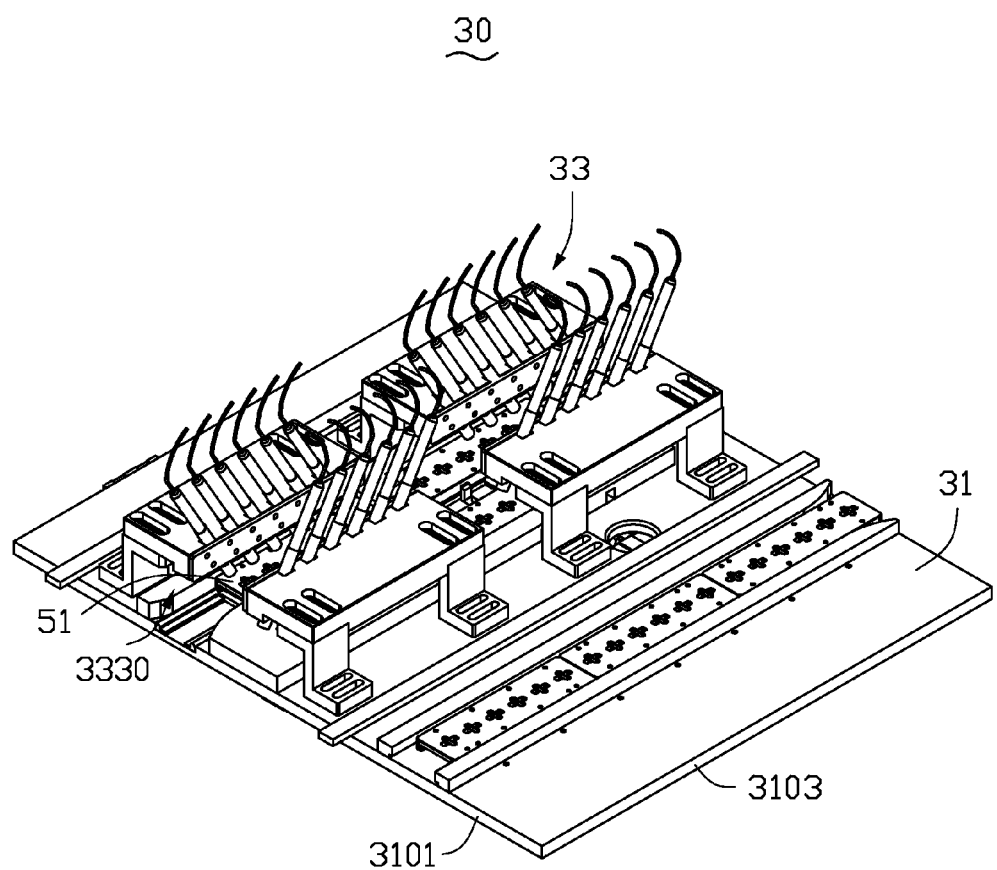
FIG. 3 is isometric view of an internal structure of the curing machine of FIG. 1.
Figure 4:
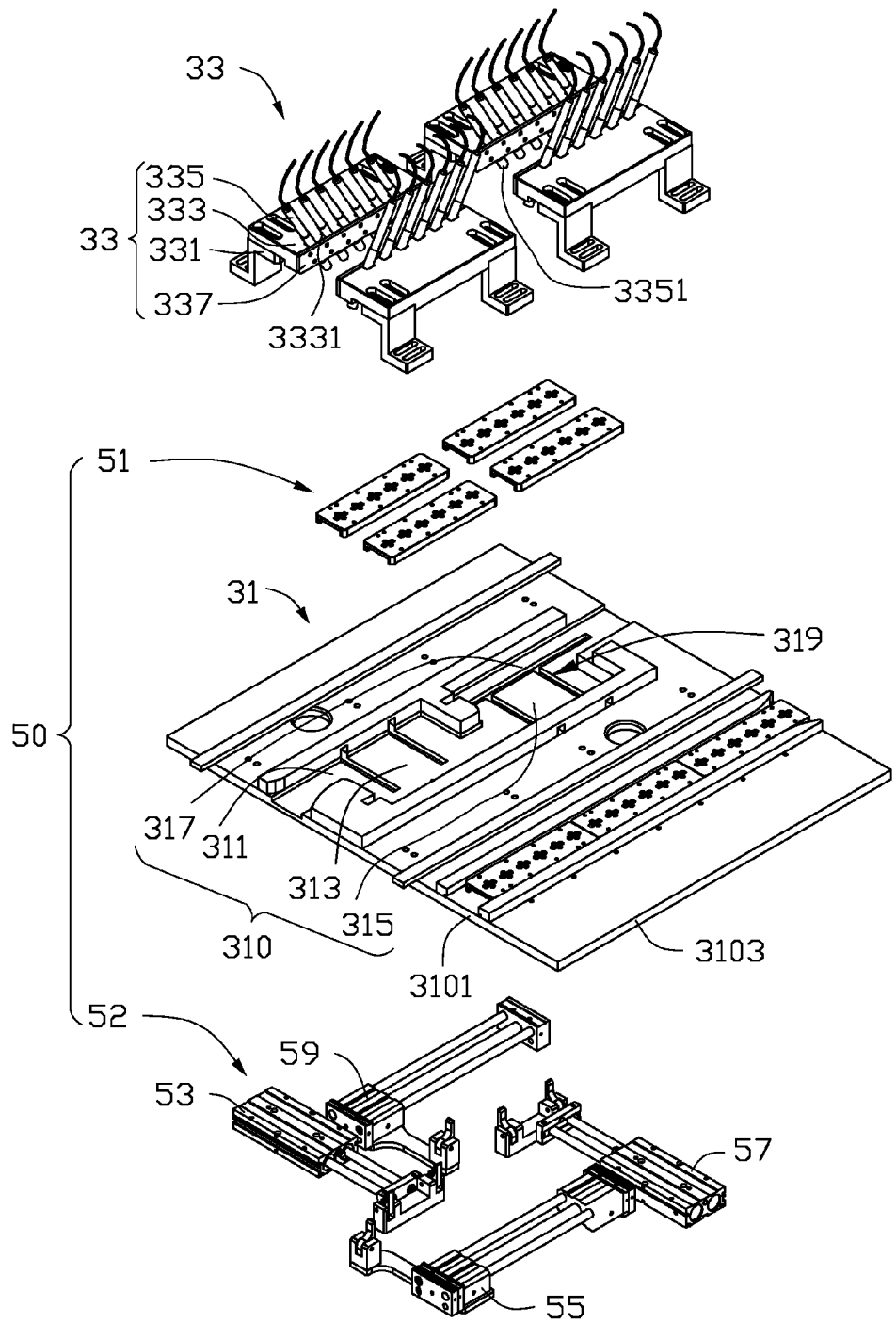
FIG. 4 is an exploded, isometric view of the internal structure of the curing machine of FIG. 1.

Referring to FIGS. 1 and 3-4, the curing machine 100 can include a bracket 10, a curing mechanism 30 coupled to the bracket 10, a transmission mechanism 50 coupled to the curing mechanism 30, and a housing 70 covering the curing mechanism 30.

The curing mechanism 30 can include a base plate 31, and a plurality of curing assemblies 33 mounted on the base plate 31.

The base plate 31 can be substantially a rectangular plate, and can be mounted on the bracket 10. The base plate 31 can include a first edge 3101 and a second edge 3103 coupled to the first edge 3101. The first edge 3101 and the second edge 3103 can be substantially perpendicular to each other. The base plate 31 can define a plurality of receiving slots 310 on a side thereof away from the bracket 10. The plurality of receiving slots 310 can be configured to receive and fix a position of the workpiece 200. Each of the plurality of receiving slots 310 can communicate with the next, and one receiving slot 310 can correspond to one curing mechanism 33.

In the illustrated embodiment, there are four receiving slots 310. The four receiving slots 310 can be a first receiving slot 311, a second receiving slot 313, a third receiving slot 315, and a fourth receiving slot 317. The first receiving slot 311 and the second receiving slot 313 can be parallel to the second edge 3103. An end of the first receiving slot 311 can extend through the first edge 3101. A side of the first slot 311 adjacent to the second receiving slot 313 can communicate with the second receiving slot 313. The second receiving slot 313 can be positioned between the first receiving slot 311 and the second edge 3103. The third receiving slot 315 and the fourth receiving slot 317 can be parallel to the second edge 3103. The third receiving slot 315 can be positioned at a side of the second receiving slot 313 away from the first edge 3101. An end of the third receiving slot 315 adjacent to the second receiving slot 313 can communicate with the second receiving slot 313. The fourth receiving slot 317 can be positioned at a side of the first receiving slot 311 away from the first edge 3101. An end of the fourth receiving slot 317 can extend through an edge of the base plate 31 parallel to the first edge 3101. A side of the fourth receiving slot 317 adjacent to the second edge 3103 can communicate with the third receiving slot 315. The base plate 31 can further define a plurality of guiding slots 319. Each guiding slot 319 can extend from a bottom of one receiving slot 310 to a bottom of the next receiving slot.

Each curing assembly 33 can include a supporting member 331, a holding member 333, a plurality of UV lamps 335, and a blocking member 337. The supporting member 331 can be substantially Z-shaped. The supporting member 331 can be mounted on the base plate 31 and can be positioned beside one receiving slot 310. The holding member 333 can be a rectangular block, and can be coupled to the supporting member 331. A side of the holding member 333 can extend from the supporting member 331 towards the second edge 3103 and can be positioned above the receiving slot 310. The supporting member 331, the holding member 333, and the base plate 31 can cooperatively define a receiving space 3330 to receive the workpieces 200. The holding member 333 can define a plurality of mounting holes 3331 at a side thereof facing the second edge 3103. The plurality of mounting holes 3331 can be parallel to each other and extend towards the base plate 31. An axis of each mounting hole 3331 can intersect with the holding member 333 at an angle of less than 90 degrees. One of the plurality of UV lamp 335 can be inserted into one mounting hole 3331. Each UV lamp 335 can include an irradiating end 3351 facing the base plate 31. When the workpiece 200 is arranged and fixed on the base plate 31 adjacent to the holding member 333, an axis of the UV lamp 335 can intersect with the first sidewall 210 or with the second sidewall 203 at an angle of less than 90 degrees, such that the UV lamp can irradiate directly onto an inside of the slot 202. In the illustrated embodiment, a curing assembly 33 can include six mounting holes 3331 and six UV lamps 335. In an alternative embodiment, numbers of the mounting hole 3331 and the UV lamp 335 can be one or more. The blocking member 337 can be mounted on the holding member 333 and can cover on the mounting holes 3331 such that the UV lamps 335 can be fixed in the mounting holes 3331.

In the illustrated embodiment, there can be four curing assemblies 33. Two of the four curing assemblies 33 can be mounted on the base plate 31 in opposition to each other, and can correspond to the first receiving slot 311 and the second receiving slot 313. The other two curing assemblies 33 can be mounted on the base plate 31 to oppose each other, and can correspond to the third receiving slot 315 and the fourth receiving slot 317. In an alternative embodiment, the receiving slots 310 can be omitted, such that the workpiece 200 can be fixed on the base plate 31 by a positioning mechanism (not shown). The positioning mechanism can be such as, but not limited to, a positioning pin. Thus, a UV lamp 335 can irradiate the UV-curable adhesive received in the hole 204 of a workpiece 200.

The transmission mechanism 50 can include a plurality of holders 51 and a plurality of pushing members 52. The holders 51 and the pushing members 52 can be movably mounted on the base plate 31. Each holder 51 can be received in a receiving slot 310. Each pushing member 52, corresponding to a holder 52, can be coupled to the base plate 31, such that the pushing member 52 can be configured to push the holder 51 received in a receiving slot 310 into the next receiving slot 310.

In the illustrated embodiment, there are four holders 51 and four pushing members 52. The four holders 51 can be configure to receive and hold the workpiece 200. The four holders 51 can be movably received in the first, second, third, and fourth receiving slots, 311, 313, 315, and 317. The four pushing members 52 can include a first pushing member 53, a second pushing member 55, a third pushing member 57, and a fourth pushing member 59. The first, second, third, and fourth pushing members 53, 55, 57, 59 can be coupled to the base plate 31 to correspond to the first, second, third, and fourth receiving slots, 311, 313, 315, and 317, and can be positioned at a side of the base plate 31 away from the curing assembly 33. An end of each pushing member 52 can extend though a guiding slot 319, and resist against the holder 51. Thus the pushing member 52 can configured to push a holder 51 from one receiving slot 310 to a next receiving slot 310 in communication with the former receiving slot 310. In an alternative embodiment, the first, second, third, and fourth pushing members, 53, 55, 57, and 59, can be omitted, the holders 51 being pushed by hand or by a robot. In an alternative embodiment, the transmission mechanism 50 can be omitted, such that the base plate 31 can define a positioning slot (not shown) configured to position the workpiece 200, or the workpiece 200 can be positioned directly on the base plate 31 under one UV lamp 335.

Referring again to FIG. 1, the housing 70 can cover the outside of the curing mechanism 30. The housing 70 can be configured to prevent light-leakage of the UV lamps 335, thereby protecting an operator using the curing machine 100.

In assembly, the pushing members 52 can be mounted on the base plate 31, and the base plate 31 can be mounted to the bracket 10. The supporting members 331 can be mounted to a side of the base plate 31 away from the bracket 10. The holding members 333 can be mounted to supporting members 331. The blocking members 337 can be mounted to holding members 335, and cover the mounting holes 331 defined on the holding members 335. The UV lamps 335 can be inserted into mounting holes 3331. The housing 70 can cover the outside of the curing mechanism 30.

In operation, the workpiece 200 with UV-curable adhesive thereon can be held in the holder 51, and the holder 51 can be conveyed into the first receiving slot 311 by an external assembly line (not shown). Thus, the first sidewall 301 can be adjacent to the first edge 3103. The UV lamp 335 can be turned on to irradiate an inside of the second sidewall 203 and the hole 204 defined on the second sidewall 203, such that the UV-curable adhesive received in the hole 204 can be cured. The pushing member 52 can push the holder 51 into the second receiving slot 313 along the guiding slot 319. The UV lamp 335 can irradiate an inside of the first sidewall 201 and the hole 204 defined on the first sidewall 201, such that the UV-curable adhesive received in the hole 204 can be cured. The pushing member 52 can push the holder 51 into the third receiving slot 315 along the guiding slot 319. The UV lamp 335 can irradiate an outside of the second sidewall 203 and the hole 204 defined on the second sidewall 203, such that the UV-curable adhesive received in the hole 204 can be cured. The pushing member 52 can push the holder 51 into the fourth receiving slot 317 along the guiding slot 319. The UV lamp 335 can irradiate an outside of the first sidewall 201 and the hole 204 defined on the first sidewall 201, such that the UV-curable adhesive received in the hole 204 can be cured. Finally, the holder 51 can be pushed out from the fourth receiving slot 317 onto an external assembly line (not shown).

In an alternative embodiment, the relative positions of the first, second, third, and fourth receiving slots, 311, 313, 315, and 317, can be varied according to requirements. Accordingly, the relation of the holder 51 to the corresponding UV lamp 335 can also be varied. The second receiving slot 313 can for example be defined to be beside the first receiving slot 311 and adjacent to the first edge 3101, and the third receiving slot 315 can be defined to be beside the second receiving slot 313. Thus the UV lamps 335 corresponding to the second receiving slot 313 can irradiate the outside of the second sidewall 203, and the UV lamps 335 corresponding to the third receiving slot 315 can irradiate the inside of the first sidewall 201. Thus, a curing sequence of the UV-curable adhesive can be: curing the UV-curable adhesive adhering on the inside of the second sidewall 203; curing the UV-curable adhesive adhering on the outside of the second sidewall 203; curing the UV-curable adhesive adhering on the inside of the first sidewall 20 and curing the UV-curable adhesive adhering on the outside of the first sidewall 20.

In an alternative embodiment, there can be one or more curing assemblies 33. The position of the curing assembly 33 can be designed according to a structure of the workpiece 200. The supporting members 331 and the blocking members 337 can be omitted such that can holding members 333 can be fixed on the base plate 31, and the UV lamps can be coupled to the holding members 333.

The embodiments shown and described above are only examples. Many details are often found in the art such as the other features of an adhesive-curing machine. Therefore, many such details are neither shown nor described. Even though numerous characteristics and advantages of the present technology have been set forth in the foregoing description, together with details of the structure and function of the present disclosure, the disclosure is illustrative only, and changes may be made in the detail, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

The invention claimed is:

1. A curing machine to cure an ultra-violet (UV)-curable adhesive adhering on a workpiece, the workpiece defining a slot thereon and a hole on a sidewall of the slot, the hole configured to receive the UV-curable adhesive, the curing machine comprising:
a curing mechanism comprising:
a base plate; and
at least one curing assembly coupled to the base plate, the curing assembly comprising:
a holding member coupled to the base plate, and
at least one UV lamp coupled to the holding member, wherein at least one workpiece is positioned on the base plate and is targeted by the at least one UV lamp, and wherein an axis of the at least one UV lamp intersects with the holding member at an angle of less than 90 degrees, and the axis intersects with the corresponding sidewall of the slot at an angle of less than 90 degrees, such that the UV lamp irradiates directly onto an inside or an outside of the sidewall.

2. The curing machine of claim 1, wherein the holding member defines at least one mounting hole at a side thereof corresponding to the at least one UV lamp; an axis of each mounting hole intersects with the holding member at an angle of less than 90 degrees; each UV lamp is partly received in one corresponding mounting hole.

3. The curing machine of claim 2, wherein each curing assembly further comprise a blocking member coupled to the holding member and covers the at least one mounting hole.

4. The curing machine of claim 1, wherein each curing assembly further comprise a supporting member coupled to the base plate; the holding member is coupled to the supporting member.

5. The curing machine of claim 1, wherein there are four curing assemblies, two of the four curing assemblies are coupled to the base plate in opposition to each other; the other two curing assemblies are coupled to the base plate in opposition to each other, and positioned beside the former two curing assemblies.

6. The curing machine of claim 5, wherein the base plate defines four receiving slots corresponding to the four curing assemblies; each of the four receiving slots communicates with the next.

7. The curing machine of claim 6, wherein the curing mechanism further comprises a transmission mechanism mounted on the base plate; the transmission mechanism comprise four holders configured to hole the workpieces; each receiving slot is configured to receiving one holder.

8. The curing machine of claim 7, wherein the four receiving slots comprises a first receiving slot, a second receiving slot, a third receiving slot, and a fourth receiving slot; the first receiving slot and the second receiving slot are parallel to each other and communicate with each other; The third receiving slot and the fourth receiving slot are parallel to each other and communicate with each other, and positioned at a side of the first receiving slot and the second receiving slot; an end of the second receiving slot communicate with the third receiving slot.

9. The curing machine of claim 7, wherein the transmission mechanism further comprises four pushing members mounted on the base plate; the four pushing members resists against the four holders respectively; each of the pushing members is configured to push the corresponding holder received in the receiving slot into the next receiving slot.

10. The curing machine of claim 1, wherein the curing mechanism further comprises a bracket, the base plate is mounted on the bracket.

11. The curing machine of claim 7, wherein the curing mechanism further comprises a housing; the housing covers the outside of the curing mechanism.

12. A curing machine, comprising:
a curing mechanism comprising:
a base plate; and
at least one curing assembly coupled to the base plate, the curing assembly comprising:
a holding member coupled to the base plate, and
at least one UV lamp coupled to the holding member, wherein an axis of the at least one UV lamp intersects with the holding member at an angle of less than 90 degrees.

13. The curing machine of claim 12, wherein the holding member defines at least one mounting hole at a side thereof corresponding to the at least one UV lamp; an axis of each mounting hole intersect with the holding member at an angle of less than 90 degrees; each UV lamp is partly received in one corresponding mounting hole.

14. The curing machine of claim 13, wherein each curing assembly further comprise a blocking member coupled to the holding member and covers the at least one mounting hole.

15. The curing machine of claim 12, wherein each curing assembly further comprise a supporting member coupled to the base plate; the holding member is coupled to the supporting member.

16. The curing machine of claim 12, wherein there are four curing assemblies, two of the four curing assemblies are coupled to the base plate in opposition; the other two curing assemblies are coupled to the base plate in opposition, and positioned beside the former two curing assemblies.

17. The curing machine of claim 16, wherein the base plate defines four receiving slots corresponding to the four curing assemblies; each of the four receiving slots communicates with the next.

18. The curing machine of claim 17, wherein the curing mechanism further comprises a transmission mechanism mounted on the base plate; the transmission mechanism comprise four holders; each receiving slot is configured to receiving one holder.

19. The curing machine of claim 18, wherein the transmission mechanism further comprises four pushing members mounted on the base plate; the four pushing members resists against the four holders respectively; each of the pushing members is configured to push the corresponding holder received in the receiving slot into the next receiving slot.

* * * * *